Patented Dec. 5, 1922.

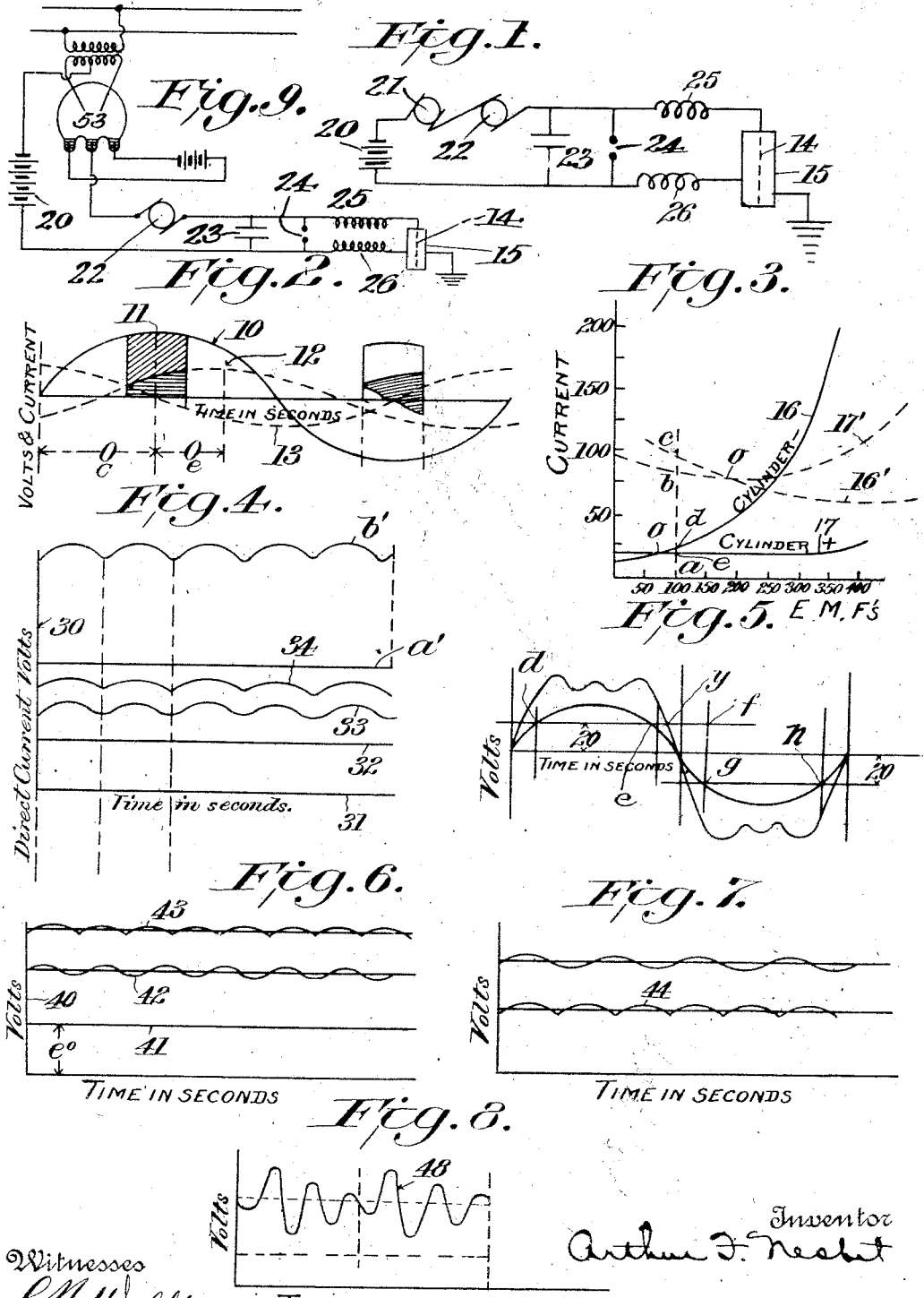

1,437,439

UNITED STATES PATENT OFFICE.

ARTHUR F. NESBIT, OF WILKINSBURG, PENNSYLVANIA.

APPARATUS FOR CONTROLLING UNIDIRECTIONAL ELECTRIC CURRENTS.

Application filed November 17, 1914. Serial No. 872,619.

*To all whom it may concern:*

Be it known that I, ARTHUR F. NESBIT, a citizen of the United States, residing at Wilkinsburg, in the county of Allegheny and State of Pennsylvania, have invented new and useful Improvements in Apparatus for Controlling Unidirectional Electric Currents, of which the following is a specification.

My invention relates to the regulation and control of unidirectional electric currents, and more particularly to the control of the resultant unidirectional current obtained by the additive effect of the electromotive forces of a plurality of separate and distinct sources of high electromotive force connected in series circuit.

The object of this invention is to control the resultant unidirectional current in the receiving circuit from a source of high unidirectional electromotive force obtained by a series or additive grouping of a number of separate and independent sources of electromotive force, and maintain the resultant current below a predetermined maximum voltage.

In the accompanying drawings, Figure 1 is a diagrammatic plan showing one arrangement of apparatus adapted for use in carrying out my invention.

Figure 2 is a diagram illustrating the conditions resulting from variations in the dielectric capacity of the medium between the electrodes shown in Figure 1.

Figure 3 is a diagram illustrating changes in the current when the cylindrical electrode is positive and negative, respectively.

Figure 4 is a diagram illustrating the voltage values obtained by the use of apparatus arranged as shown in Figure 1.

Figures 5, 6, 7 and 8 are diagrams illustrating various forms of electromotive force waves.

Figure 9 is a diagrammatic plan showing the modified arrangement of apparatus embodying and adapted for use in practicing my invention.

Referring to Figure 2 of the drawings, the numeral 10 designates the electromotive force wave to be rectified, the maximum electromotive force being indicated at 11. The maximum of the current lagging behind the maximum of electromotive force, due to preponderance of inductance effect over condenser effect is indicated at 12. The maximum of the current leading the maximum value of the electromotive force, due to large preponderance of condenser effect over the inductance effect, is indicated at 13. Mechanical rectifiers are not provided with means capable of changing the values of the maximum of the current lagging behind, or the maximum of the current leading the maximum value of the electromotive force, except possibly an automatic variation of their spark gaps. This fluctuating of current phases relative to the electromotive force wave is very difficult to control. For a given voltage difference between the central wire 14 (see Figure 1) and the outer concentric conductor 15, whether grounded or not, the gaseous or fluid media surrounding the electrode 14 may vary slowly or very suddenly in its dielectric capacity. This variation of dielectric capacity is sufficient in itself to cause the current to shift from a lagging to a leading phase, or vice versa, as illustrated in Figure 2. During this shifting of the current phases, the wattmeter, measuring the power supplied to the corona discharge in the precipitating outfit, passes from a given value to a lower one and may, perhaps, return part way to or beyond its original value as illustrated in Figure 3 by the curves 16 and 17, the curve 16 representing the current required at an electromotive force of 100 when the cylinder is positive, and 17 indicating the current for the same electromotive force when the cylinder is negative.

The present state of the art of electrical precipitation rather suggests that in the near future it may be possible to anticipate to a nicety the instant of time at which these shiftings of current phases take place. When this is the case I am convinced that automatic adjustment, or variation of resistances, inductances and capacities may be made at the proper instants to maintain the precipitation at a high degree of efficiency. This objection may be partly overcome by changing the dimensions of the cylinder 15 and also changing the voltage. A new set of curves, however, would now hold, as indicated at dotted lines 16' and 17', Figure 3, and for them there would be an unstable point O. The dotted curves show that a current $a$—$b$ is required at an electromotive force of 100 with the cylinder positive, and this current for a negative cylinder or electrode, is less than the corresponding current $a$—$c$ when the current was positive.

Referring to Figure 5, if 20 represents the voltage at which the corona formation begins, then for a sine alternating wave of electromotive force applied between the active and grounded electrodes, the existence of the corona discharge will last only during that part of the wave $d$ to $e$, and after an interval $e$ to $f$, will reverse its polarity for an equal interval $g$ to $h$, provided that the current wave is in phase with the impressed electromotive force wave. If the impressed electromotive force wave and the wave of current are not in phase, there will still exist an equivalent cyclic interval corresponding to $d-e$ and $g-h$, during which the corona discharge will take place. It is thus seen that there is an interval of cessation of active ionization which is dependent upon the type of electromotive force wave, as suggested by a consideration of the wave intervals $d-e$, $x-y$, etc. Such a periodic form of alternating electromotive force wave, or a periodically undulating alternating electromotive force wave, causes a reversal of the polarity of the leads from the generator or other source of the electromotive force.

It is highly desirable in certain cases of electrical precipitation of suspended particles in gaseous and fluid bodies, to maintain a constant polarity, even though slight fluctuations between the maximum and minimum values of the voltage be admissible. It is a difficult matter to maintain such phase relations between alternating electromotive forces and the corona currents, that the current shall always be unidirectional even when the electromotive force is made unidirectional by means of a mechanical rectifier. This liability of the phase shifting of the electromotive forces and currents very materially alters the efficiency of the electrical precipitation when this type of rectifier is used. In carrying out my invention I apply between the active and grounded electrodes, a high direct current voltage obtained by the superposition of a combination of direct current voltages such as might be obtained by connecting primary or secondary cells in series with direct current generators, or by connecting two or more high voltage direct current generators in series with each other, depending upon the potential difference needed for the work to be done. These direct current generators may be of the open or closed coil type, such as have been employed for commercial series arc lighting, the type now successfully employed in the high voltage transmission projects by the Thury system in use in Europe, or any system whereby the average voltage shall be maintained continuously equal to, or by a predetermined and adjustable amount, greater than the voltage at which corona formation takes place. These generators may be of the series, shunt, cumulative or differently compound wound types, depending upon the degree of automatic regulation of the voltage required in accordance with the variations in the dielectric capacity of the gaseous or fluid bodies within which the electric discharge takes place; also, upon whether the electric discharge is to be brush, disruptive or oscillatory like in character.

The application of such superimposed electromotive forces in producing high voltage direct current electric discharges may be understood from Figure 1. Referring to said figure, 20 designates storage cells, 21 an open coil dynamo and 22 a closed coil dynamo connected in series with the central electrode 14 and cylindrical electrode 15 of a smoke precipitating apparatus. Obviously the current resulting from the use of my improved method is adapted for use with an X-ray tube, or similar apparatus utilizing a high electrical potential as well as with the precipitating apparatus shown. The employment of the condenser 23, the spark gap 24, and the inductances 25 and 26, is for the purpose of controlling and adjusting the electrical undulations admissible with the form of resultant electromotive force wave. The adjustable spark gap 24 is not allowed to operate except to produce feeble oscillations at best, and, only when surges take place will there be any tendency to produce an arc across it. When such is the case, the spark gap serves to protect the device 14—15 against too high voltages. These sources of electromotive force are connected in such a way that their voltages are additive, thus producing a voltage of the value $a'-b'$, in Figure 4, above that necessary to give rise to a continuous and unidirectional electrical discharge at the electrodes 14, 15. Referring to Figure 4 the scale of direct current volts is indicated at 30 and the time in seconds by the lines 31. The necessary voltage above zero to secure the corona voltage is indicated at $a'$. The voltage of the storage cells is indicated at 32, the voltage of the open coil dynamo at 33, the voltage of the closed coil dynamo at 34, and the resultant superimposed electromotive force wave at $b'$. A mercury arc rectifier 53 may replace dynamo 21, the circuit connections remaining as indicated in Figure 9.

It is immaterial whether or not the active electrode is made the positive or negative electrode, as far as my application of unidirectional electromotive forces to the electrical precipitation of suspended matter in gaseous and fluid bodies is concerned.

For the sake of illustration, the averages of these separate or resultant superimposed electromotive forces may be of the forms represented by any of the curves of Figure 6 for a given adjustment of the resistance, inductance and capacity of the circuit forming the circuit factors, apart from the variations in the dielectric capacity of the gaseous or fluid medium. Referring to Figure 6, the volt scale is indicated at 40, the corona forming voltage at 41, and 42 and 43 represent the averages of resultant superimposed electromotive forces. It is not necessary that the voltage of the individual machines, or other sources of the series grouping should be of the same value. They may be of any value whatever, consistent with the type of generator or source of electromotive forces employed. That is, the electromotive force wave developed by the generator may have a fluctuation between its maximum and minimum values as indicated by the rippled waves in Figure 6, and the superposition of any source of constant electromotive force will result in a corresponding elevation of the resultant electromotive force wave without affecting the ripples present. The magnitude of these fluctuations between the maximum and minimum values of the ripples will depend upon the number of commutator segments employed in the generators. The straight lines through the curves 42 and 43 of Figure 6, and the curve 44 of Figure 7, represent the average values of the electromotive forces of the separate sources. That is for example, such as would be indicated very approximately by a voltmeter connected across their terminals, while the rippled forms indicate such as would be shown by an oscillograph.

Thus the curve 42 of Figure 6 or the upper curve of Figure 7 which are rippled in form, will be produced by a closed coil dynamo giving high voltage and ripples smoothed out in the open coil source by means of inductances inherent in the circuit itself. The ripples in curves 43 and 44 may be those of the electromotive force waves of open coil dynamos, or of mercury arc rectifiers.

The upper curve of Figure 7 is identical in form and is produced in the same manner as the curve 42 of Figure 6, and Figure 7 shows two curves which are exactly similar to curves 42 and 43 of Figure 6, but which are transposed as to their relative values.

The usual method of obtaining unidirectional electromotive forces for electrical precipitation, by the rectification of an alternating or oscillatory electromotive force, by means of a mechanical or electrolytic rectifier, is here departed from, in that the employment of the rectifier as a distinct unit to obtain unidirectional currents from a source of alternating electromotive force, whether a generator or a transformer, is entirely eliminated.

The number of electromotive forces superimposed for the purpose of obtaining high electric potential of a given and approximately constant polarity will depend upon the work to be done. The presence of a small or large ripple in the resultant electromotive force wave, as suggested in Figure 6 is especially desirable, in order to adjust the electrical circuits so that the electrical discharges may, at will, be made disruptive or undulatory in character. These types of discharges may be obtained by the employment of circuit factors such as adjustable resistances, inductances, capacities, spark gaps, singing arcs, or any of the well known means of securing the same results. Thus, if the ripples in the resultant electromotive force wave are of the form shown at 44, in Figure 7, it is possible to make the electrical discharge take place under an undulatory, yet unidirectional electromotive force, similar to that indicated at 48, Figure 8. The application of such resultant electromotive forces is especially adapted to the precipitation of suspended matter in gaseous and fluid bodies. In this connection it will be understood that I do not wish to limit myself to the production of electrical discharges by the type of apparatus herein suggested, i. e. the electrical precipitation apparatus, as these same high direct current or approximately constant, or unidirectional voltages may be usefully applied in other ways and by other forms of apparatus in chemical, engineering and physical processes, without departing from the spirit of my invention.

I claim as my invention:—

In an electrical system, a receiving circuit, means for supplying thereto unidirectional currents of high potential of approximately steady electromotive forces, and means for maintaining the electromotive forces of said current below a predetermined maximum voltage and for regulating the same so as to cause the currents to become undulatory, comprising a condenser and a gap each in bridge of said circuit, and inductance coils in series therewith.

In testimony whereof I have hereunto set my hand in presence of two subscribing witnesses.

ARTHUR F. NESBIT.

Witnesses:
ALBERT H. KOTSCH,
W. J. MOORE.